June 3, 1952  E. C. STEINBACH ET AL  2,599,292
OVERLOAD RELEASE COUPLING
Filed Dec. 31, 1947
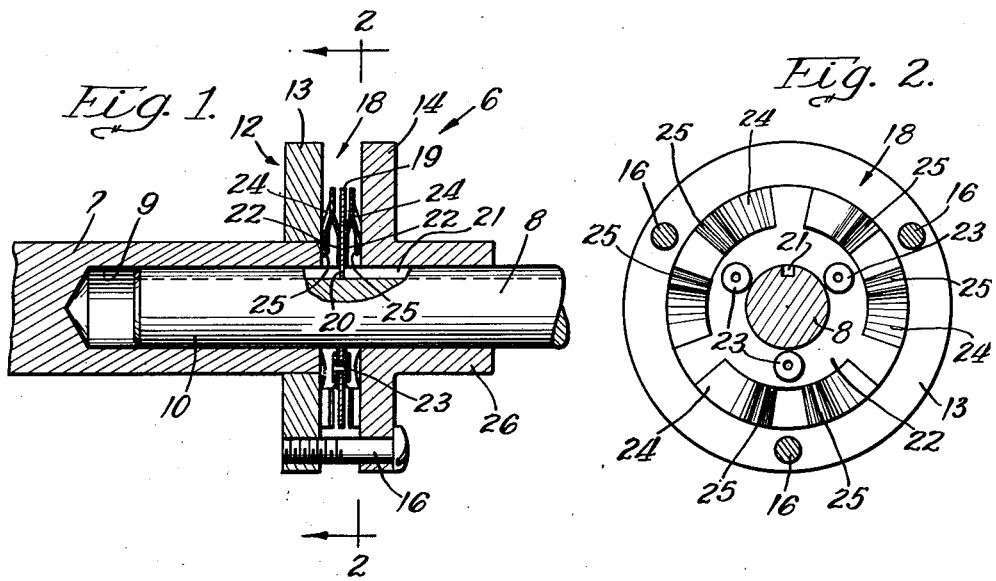
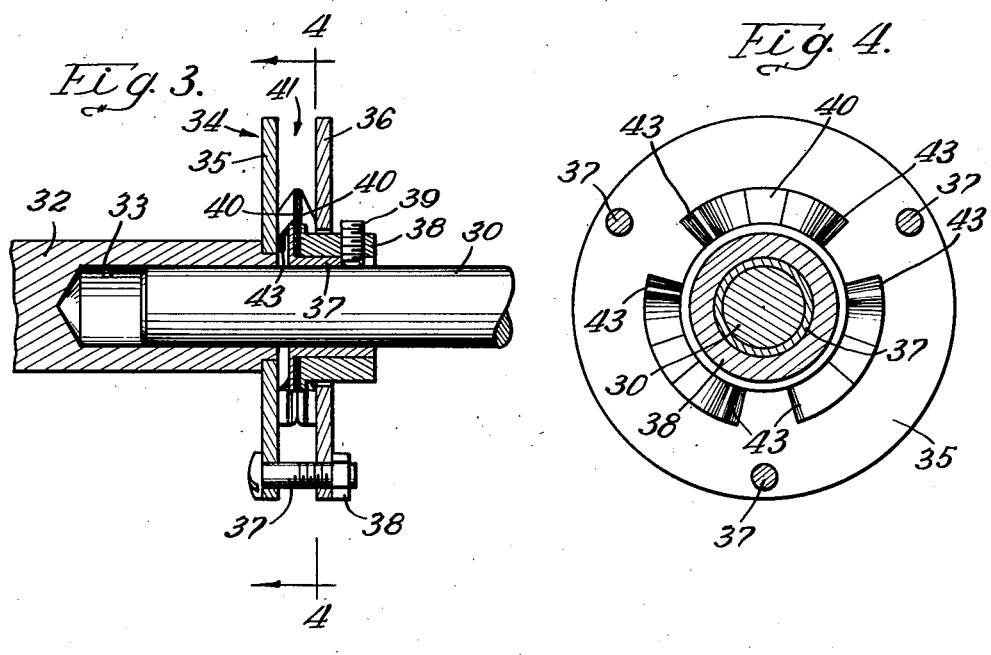
Inventors:
Emil C. Steinbach
Paul M. Ewald
By Brown, Jackson, Boettcher & Dienner,
Att'ys.

Patented June 3, 1952

2,599,292

UNITED STATES PATENT OFFICE 2,599,292

OVERLOAD RELEASE COUPLING

Emil C. Steinbach, Chicago, and Paul M. Ewald, Skokie, Ill., assignors to Charles P. Peirce, Evanston, Ill.

Application December 31, 1947, Serial No. 794,890

3 Claims. (Cl. 64—30)

1

Our present invention relates to an improvement in clutches.

The clutch of our invention is particularly adapted for use for normally establishing a frictional driving connection between drive and driven members, but which is adapted to slip upon overloading of the driven member or when it is desired to bring the driven member to a stop prior to stopping of the drive member. A clutch of the character referred to has use, for example, in a wire recorder in which supply and take up reels are adapted to be mounted for travel of wire from one to the other of the reels. In such a device the shaft means for carrying the reels each comprises a drive shaft and a driven shaft with the driven shaft having a reel keyed or otherwise secured thereto. The clutch of our invention is adapted to be arranged between the drive and driven shafts so that the driven shaft and the reel carried thereby may be caused to be rotated in effecting travel of wire from one reel to the other reel. In operation of the wire recorder, direction of travel of the wire between the reels is frequently reversed or stopped, and it is desirable to provide for slipping of the driven shaft with the wire drawn taut between the reels to prevent breaking of the wire. While the clutch of our invention is particularly suitable for use in a wire recorder, it will be understood that it is not limited thereto but has utility for other mechanisms.

It is an object of our invention to provide a clutch of the character noted formed of few parts and of simple and economical construction.

A further object of our invention is to provide a clutch for use between drive and driven shafts comprising clutch plate means for one of the shafts, and clutch spring disc means for the other of the shafts with the clutch spring disc means having frictional clutching engagement with the clutch plate means to establish a driving connection between the drive and driven shafts.

A further object is to provide a clutch plate means comprising a pair of space clutch plate members between which a spring clutch disc means is disposed with the clutch plate members being adjustable relative to each other to vary the degree of frictional clutching engagement between the clutch plate members and the spring clutch disc means.

A further object is to provide a clutch in which end thrust between the drive and driven shafts between which the clutch is arranged is substantially eliminated.

A further object is to provide a clutch of the

2 character noted for permitting relative axial movement between the drive and driven shafts with which the clutch is associated without affecting operation of the clutch.

The above and other objects and advantages of our invention will appear from the detailed description.

Now in order to acquaint those skilled in the art with the manner of constructing and utilizing clutches in accordance with our invention, we shall describe in connection with the accompanying drawings certain preferred embodiments of our invention.

In the drawings:

Figure 1 is a longitudinal sectional view with certain parts being shown in elevation of one form of clutch means of our invention arranged between coaxially and telescopically arranged drive and driven shafts;

Figure 2 is a detail sectional view taken substantially on the line 2—2 of Figure 1 looking in the direction indicated by the arrows;

Figure 3 is a longitudinal sectional view through another form of clutch means of our present invention and showing the manner in which it is arranged between a pair of coaxially and telescopically arranged drive and driven shafts; and Figure 4 is a detail sectional view taken substantially on the line 4—4 of Figure 3 looking in the direction indicated by the arrows.

Referring now to Figures 1 and 2, we have shown a clutch means 6 of our invention arranged between a drive shaft 7 and a driven shaft 8 in which the drive shaft 7 is provided with an end bore 9 within which the adjacent end portion 10 of the driven shaft 8 is piloted.

The clutch means 6 of our invention comprises clutch plate means indicated generally at 12 formed by a first clutch plate member 13 fixed adjacent the end of drive shaft 8 in which the bore 9 is formed, and a second clutch plate member 14 which is secured in axially spaced relation of the clutch plate member 13 by a plurality of screws 16 which extend through the plate member 14 and have threaded engagement with the plate member 13. The clutch means 6 further embodies spring clutch disc means indicated generally at 18 comprising a metal disc member 19 having a key portion 20 fitting in the groove 21 extending axially in the driven shaft 8, and to which disc member 19 a pair of spring disc members 22—22 are suitably secured as by the rivets indicated at 23. The spring disc members 22 are formed with a plurality of spring fingers 24 having outer end portions 25 adapted to have frictional engagement with the adjacent surfaces of the clutch plate members 13 and 14 as shown in Figure 1. The clutch plate member 14 preferably includes an integral hub portion 26 and which, with the member 14 mounted with respect of the clutch plate member 13 as illustrated in Figure 1, provides for supporting the adjacent end of the driven shaft 8. It will be observed that in the clutch above described that the driven shaft 8 is adapted to be driven by the drive shaft 7 through the pair of spring disc members 22—22 by the frictional engagement of the spring fingers 24 thereof with the plate members 13 and 14 and through the key 20 of the disc member 19. Upon overloading of the driven shaft 8 or upon the application of braking force the spring ends 25 of the pair of spring disc members 22 are adapted to slip relative of the surfaces of the clutch plate members 13 and 14 with which they are in engagement.

It will be observed that the degree of frictional clutching engagement between the pair of clutch spring discs 22 may be adjusted by means of the plurality of screws 16 for varying the degree of compression of the spring fingers 24 of the pair of spring disc members 22 between the plate members 13 and 14 by regulating the spacing between the latter members. The screws 16 thus provide a simple means of varying the compression and the degree of frictional clutching engagement of the spring members 22 with the plate members 13 and 14 so that the drive and driven shafts may be adjusted to slip relative to each other at any desired degree. It will be further observed that the drive and driven shafts may move axially relative to each other without interfering with the operation of the clutch by the sliding movement of key portion 20 of disc 19 in groove 21 of the driven shaft 8.

Referring now to Figures 3 and 4, we have shown a modified form of clutch means constructed in accordance with our invention in which as before a driven shaft 30 is piloted in a drive shaft 32 in a bore 33 in the latter. In this form of the invention the clutch plate means 34 comprises a first clutch plate member 35 suitably secured in a shoulder formed at one end of the drive shaft 32, and a second clutch plate member 36 which is secured in axially spaced relation with respect of the clutch plate member 35 by a plurality of bolts indicated at 37. The threaded ends of the bolts 37 have threaded engagement with suitable tapped openings formed in the plate member 36 and the bolts 37 carry nuts 38 at their outer ends for securing the clutch plate members 35 and 36 in an adjusted axially spaced relation with respect to each other. A pair of coaxially arranged flanged collars 37' and 38' are adapted to be secured to each other and to the driven shaft by means of a set screw 39 so that these collar members rotate with the driven shaft 30. Between the flanged ends of the collar members 37' and 38', the inner peripheries of a pair of spring disc members 40—40 forming a spring disc means 41 for the clutch are secured. The spring disc members 40 are each formed with a plurality of projecting spring fingers, the curved opposite ends 43 of which are adapted to have frictional clutching engagement with the adjacent surfaces of the clutch members 35 and 36. Upon driving of the drive shaft 32 frictional engagement between the ends of the spring fingers of spring clutch discs 40 with the adjacent surfaces of clutch members 35 and 36 and the collar members 37' and 38' secured to the driven shaft 30 by the set screw 39 provides for driving of the driven shaft. As before, the spring fingers of the pair of spring disc members 40—40 may be compressed to the desired extent between the clutch plate members 35 and 36 by adjustment of the bolts 37 to provide the degree of frictional clutching engagement desired between the drive and driven shafts. In the form of the invention last described, the collar arrangement provided by the collar members 37' and 38' for connecting the spring disc clutch members 40—40 to the driven shaft 30 by means of the set screw 39 does not permit of any substantial axial movement of the drive and driven shafts with respect to each other.

While we have shown what we consider to be the preferred embodiments of our invention, it will be understood that various modifications and arrangements may be made therein without departing from the spirit and scope of our invention.

We claim:

1. A clutch for use between coaxially extending drive and driven shafts adapted automatically to disengage at predetermined overloads, comprising first and second spring disc members mounted coaxially about said driven shaft for rotation therewith, spring fingers formed on each of said disc members, projecting axially outward therefrom; a first clutch plate member mounted rigidly on said drive shaft and having one face thereof in frictional contact with said spring fingers of one of said disc members, a second clutch plate member mounted about said driven shaft in axial spaced parallel relation with respect to said first plate member and having one face thereof in frictional contact with said spring fingers of said second disc member, and adjustable stop means rigidly securing said clutch plate members in fixedly spaced driving relation, said stop means also serving to regulate and define the axial spacing of said two clutch plates and the axial compressive loading of said spring fingers positioned therebetween whereby the torsional load capable of being transmitted by said friction clutch coupling so formed may be regulated at desired values.

2. An overload clutch of the class described for use between co-axially extending drive and driven shafts, comprising a first clutch plate member fixed to said drive shaft, a second clutch plate member mounted coaxially about said driven shaft for axial movement therealong, adjustable stop means rigidly securing said two plate members in spaced parallel relation rigidly securing the clutch plate members in fixedly spaced driving relation, collar means fixed to said driven shaft, and spring clutch disc means comprising a pair of spring disc members carried by said collar means and extending between said clutch plate members, said spring disc means being compressed between and by said clutch plate members to provide frictional clutching engagement thereof with the latter.

3. An overload clutch of the class described for use between telescopically arranged drive and driven shafts, comprising a first clutch plate member fixed to said drive shaft, a second clutch plate member mounted about said driven shaft, stop means rigidly securing the clutch plate members in fixedly spaced driving relation, spring disc means disposed between and having frictional clutching engagement with said first and second clutch plate members, said disc means being characterized by a plurality of resilient spring fingers which frictionally engage opposed inner faces of said two clutch plate members; a key connecting said spring disc means with an axially extending groove formed in said driven shaft whereby said disc means serve to rotatively drive said driven shaft during operation of said clutch.

EMIL C. STEINBACH.
PAUL M. EWALD.

REFERENCES CITED

The following references are of record in the file of this patent:

UNITED STATES PATENTS

| Number | Name | Date |
|---|---|---|
| 1,132,958 | Miller | Mar. 23, 1915 |
| 1,509,523 | Monosmith | Sept. 23, 1924 |
| 1,862,991 | Vargha | June 14, 1932 |
| 2,138,170 | Hunt | Nov. 29, 1938 |
| 2,340,186 | Harden | Jan. 25, 1944 |